United States Patent

Markegard et al.

[11] Patent Number: 6,116,062
[45] Date of Patent: Sep. 12, 2000

[54] WHEEL BLOCKING BRAKE LOCK

[75] Inventors: Harvey Keith Markegard; Joseph Michael Higgins, both of Billings, Mont.

[73] Assignee: Blockit & Lockit Systems, Billings, Mont.

[21] Appl. No.: 09/363,776

[22] Filed: Jul. 29, 1999

Related U.S. Application Data

[63] Continuation-in-part of application No. 09/103,008, Jun. 23, 1998, abandoned.

[51] Int. Cl.[7] ................................................ E05B 73/00
[52] U.S. Cl. ............................ 70/19; 70/226; 70/237; 188/32
[58] Field of Search .......................... 70/226, 225, 18, 70/19, 237; 188/4 R, 36, 5, 32

[56] References Cited

U.S. PATENT DOCUMENTS

| | | | |
|---|---|---|---|
| 1,149,006 | 8/1915 | Weaver | 188/32 |
| 3,537,548 | 11/1970 | Jeppesen | 188/32 |
| 3,695,071 | 10/1972 | West | 70/225 |
| 4,031,726 | 3/1976 | De Jager | 70/226 |
| 4,399,893 | 8/1983 | Switzer | 188/32 |
| 4,476,961 | 10/1984 | Luigi | 188/32 |
| 4,538,135 | 8/1985 | Turner | 70/241 |
| 4,649,724 | 3/1987 | Raine | 70/226 |
| 4,751,849 | 6/1988 | Givati | 180/287 |
| 4,804,070 | 2/1989 | Bohler | 70/18 |
| 4,833,442 | 5/1989 | Von Heck | 70/226 |
| 4,913,265 | 4/1990 | Richards | 188/32 |
| 4,955,459 | 9/1990 | Murphy | 188/32 |
| 5,134,868 | 8/1992 | Bethards | 70/18 |
| 5,214,944 | 6/1993 | Wolthoff | 70/226 |
| 5,263,553 | 11/1993 | Duncan | 188/32 |
| 5,312,213 | 5/1994 | Winsor | 410/9 |
| 5,465,814 | 11/1995 | Ziaylek | 188/4 R |
| 5,735,410 | 4/1998 | Kallstrom | 70/235 |
| 5,803,208 | 9/1998 | Blach | 188/4 R |

FOREIGN PATENT DOCUMENTS

| | | | |
|---|---|---|---|
| 4-201653 | 7/1992 | Japan | 70/225 |

*Primary Examiner*—Darnell M. Boucher
*Assistant Examiner*—John B. Walsh
*Attorney, Agent, or Firm*—Rick Martin

[57] ABSTRACT

A chock-type wheel lock has two V-shaped cradles joined at the lowermost part of the "V" horizontally at the tire's center. A sliding bar and cylinder lock engage the cradle members together. Alternatively, a series of adjustment blocks join the cradles together for differing tire sizes. The chocks may be adjustable having an axle which slides into notches in a cradle housing to provide for multi-size tire use.

22 Claims, 6 Drawing Sheets

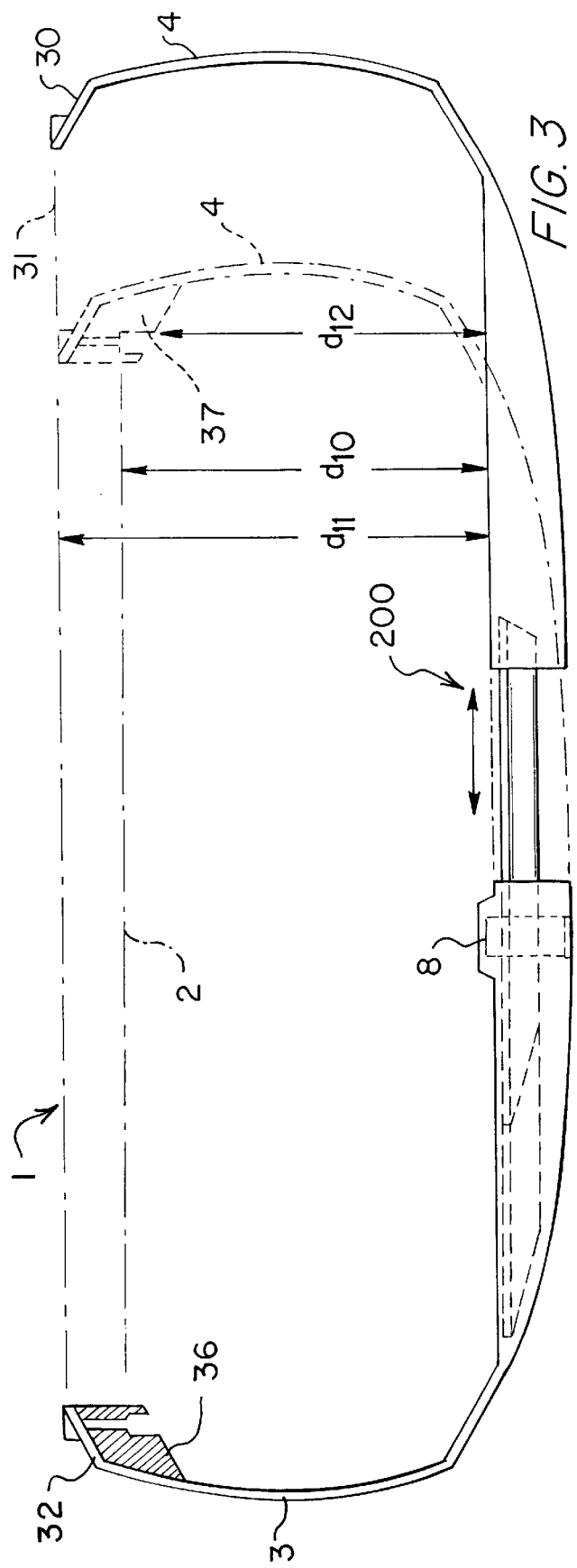
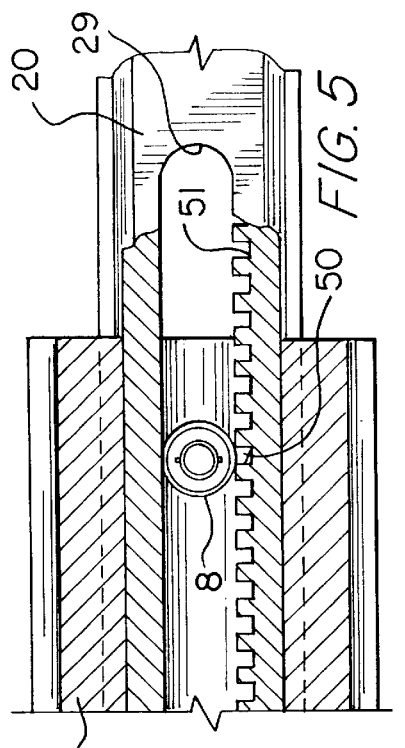
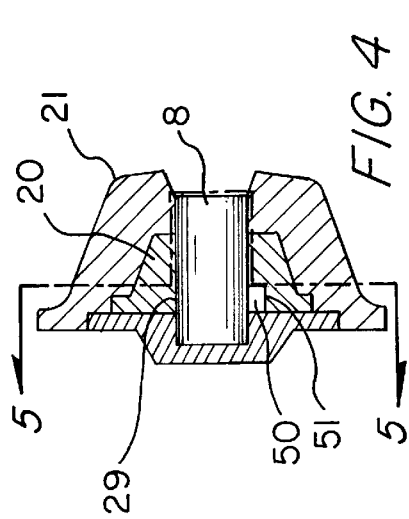

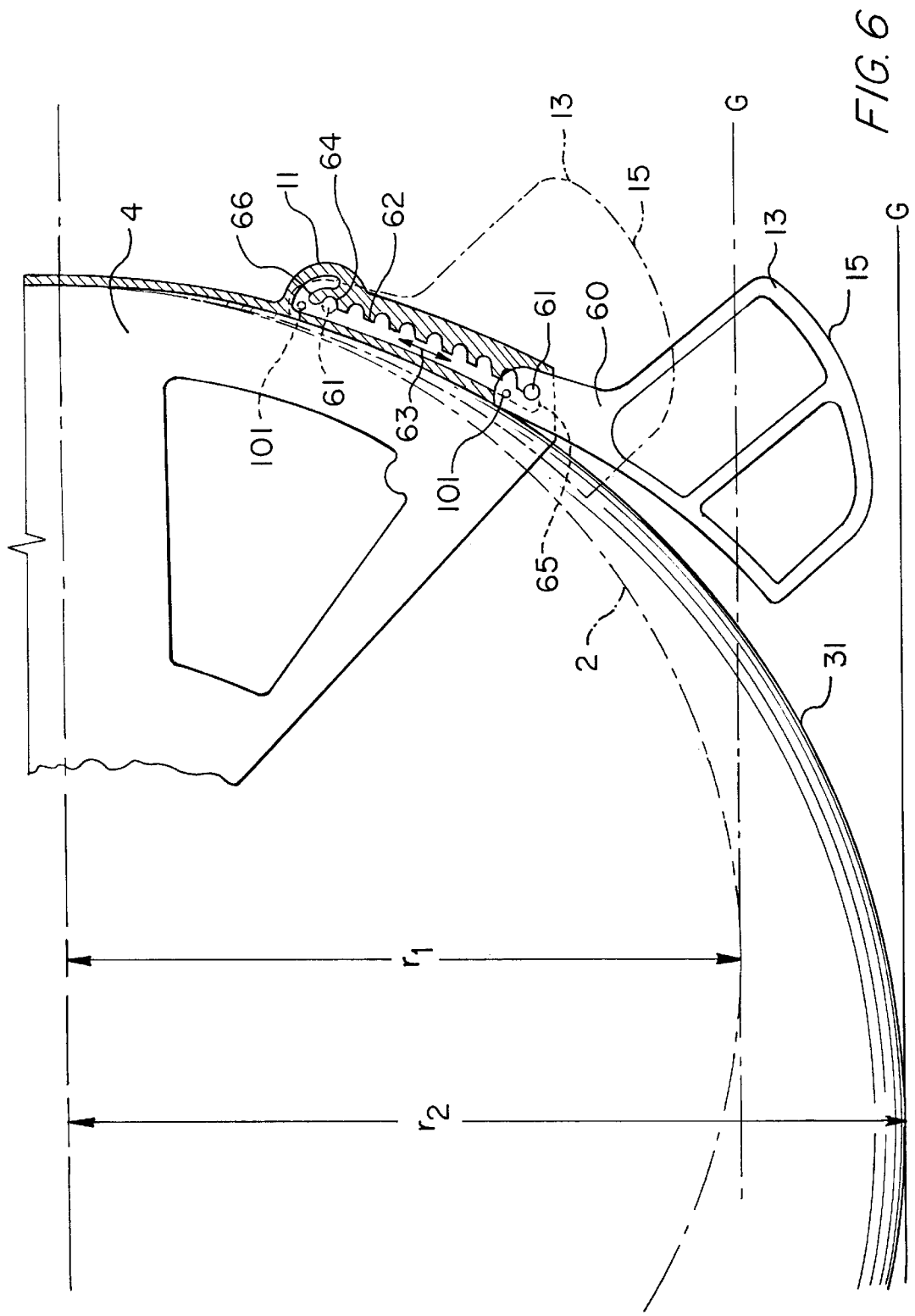

WHEEL BLOCKING BRAKE LOCK

CROSS REFERENCED PATENTS

The present application is a continuation in part of U.S. patent Ser. No. 09/103,008 file Jun. 23, 1998 now abandoned.

FIELD OF INVENTION

The present invention relates to trailer and automobile wheel lock systems which block the rolling of the tire.

BACKGROUND OF THE INVENTION

Trailer theft is wide-spread, especially at rodeos. Horse trailers can cost over $100,000 and have human staterooms which may contain jewelry and other valuables. It is important for a woman to be able to lift and secure the trailer wheel lock because the husband may be riding or in the case of a marina, fishing.

It is felt that the wheel chock approach is the most efficient. A modern wheel chock system is found in U.S. Pat. No. 5,263,553 (1993) to Duncan. Two triangular-shaped chocks are slid against the respective front and rear sides of the tire. Next, a coupling bar between the chocks is aligned, latched and padlocked. The coupling bar is located below the centerline of the tire. Therefore, the device can be foiled by jacking the axle and tire over the chocks and driving forward. Nothing prevents the chocks from disengaging from the tire, and the vehicle could be stolen without the use of torches or cutting tools.

An early wheel chock invention is taught by U.S. Pat. No. 3,537,548 (1970) to Jeppeson. Jeppeson teaches a pair of wheel chocks tightened onto the tire with chains. A hubcap guard is also supported by the chains. Installation is complex and dirties the user as she adjusts chains.

U.S. Pat. No. 3,695,071 (1972) to West discloses a pair of wheel chocks centered on a hubcap shield. A vertical locking arm engages the top of the tire. Installation is moderately complex since five interlocking parts are used plus the padlock. Also, transporting and storing the system is clumsy.

U.S. Pat. No. 4,649,724 (1987) to Raine discloses a modification of the West design having an adjustable length stem to secure the chocks and upper engagement arm. The device is costly and complex.

The prior art does not teach or suggest a simple cost-effective two-piece wheel chock system. The present invention offers a two-piece wheel lock solution. Each cradle half has a handle. The device covers above and below the tire centerline so it cannot be foiled by raising the tire. Adjustable blocking chocks allows one system to fit multiple size tires.

SUMMARY OF THE INVENTION

The main aspect of the present invention is to provide a simple, two-piece lightweight wheel chock type lock. Another aspect of the present invention is to provide self-adjusting chocks which fit multiple tire sizes.

Another aspect of the present invention is to provide alarm electronics in the casing.

Other aspects of this invention will appear from the following description and appended claims, reference being made to the accompanying drawings forming a part of this specification wherein like reference characters designate corresponding parts in the several views.

The preferred embodiment consists of a pair of interlocking cradles which join in the middle like two pieces of pizza pie. The lower portion of each cradle has a chock assembly housing. Each chock assembly has an axle on its uppermost portion which rides inside the housing on notches. About eight notches allow for fitting several tire sizes with one system. The chocks rotate inside the cradle halves for compact storage.

BRIEF DESCRIPTION OF THE DRAWINGS

FIG. 1 is a side perspective view of the preferred embodiment hanging on a tire, chocks set in place to touch the ground.

FIG. 2 is a side plan view of the same device without the adjustable chocks or handles.

FIG. 3 is a top plan view of the same device.

FIG. 4 is a cross sectional view of the lock taken along line 4—4 of FIG. 2.

FIG. 5 is a cross sectional view of the lock taken along line 5—5 of FIG. 4.

FIG. 6 is a close-up partial cutaway of the adjustable chock assembly shown fitting two different tire widths, chocks hanging in place above the ground.

Figure 7:
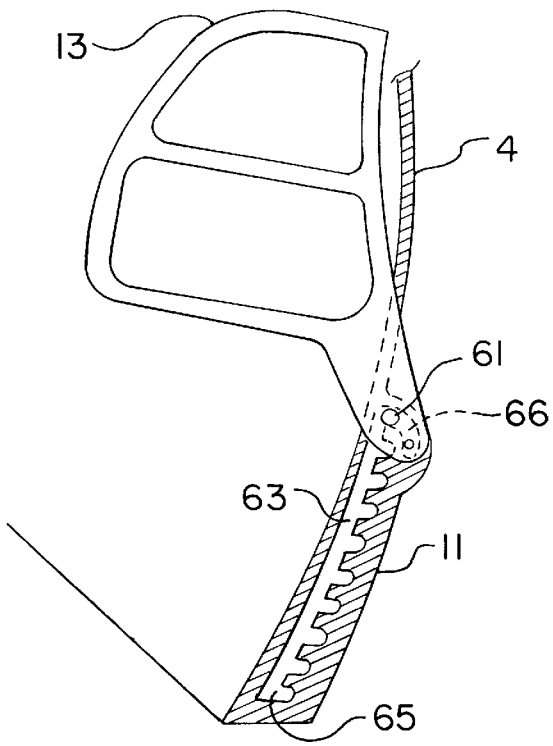
FIG. 7 is a close-up partial cutaway of the adjustable chock assembly in the stored position.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figures 1, 2:
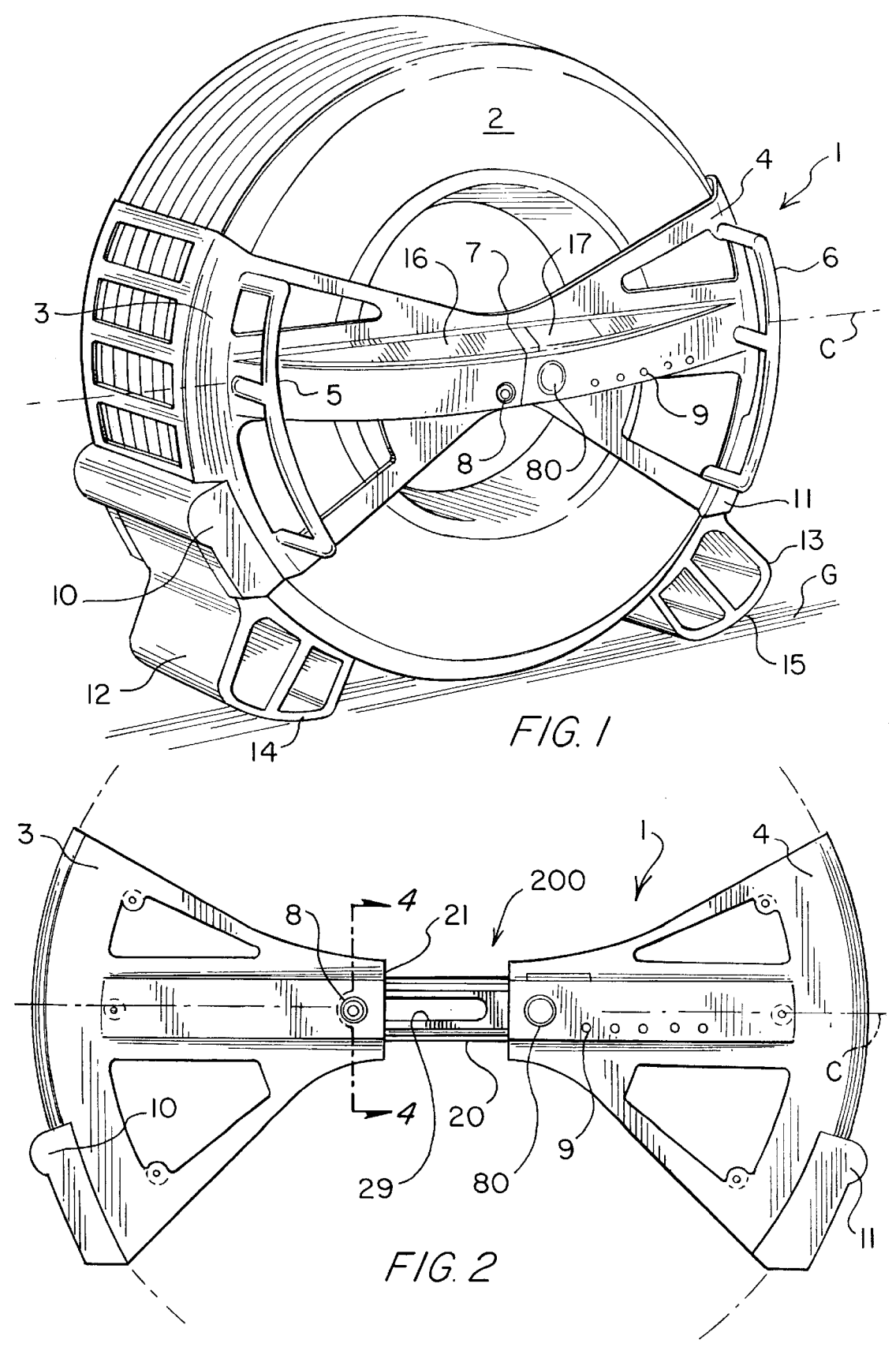

Referring first to FIG. 1 a tire 2 is locked by the wheel lock 1, the preferred embodiment. Wheel lock 1 has a left cradle 3, a right cradle 4 which are shown to touch at 7 in this figure where the device is adjusted to its smallest size. Handles 5, 6 simplify installation and transport. Chock housings 10, 11 are located at the lower portion of their respective cradles. The adjustable chocks 12, 13 slide to a locked position inside the chock housings. The locked position engages the locking surfaces 14, 15 in contact with the ground G as shown. The locking surfaces 14, 15 each having more than 30 square inches of surface contact.

The cradles 3, 4 extend above and below the horizontal centerline C of the tire 2. The cylinder lock 8 secures the cradles 3, 4 together. Optional electronics include a series of L.E.D. flashing lights 9 and an interchangeable alarm (variable frequency siren and/or flashing strobe light) 80. Housings 16, 17 house the slider bar 200 and optional electronics shown in FIGS. 8, 9. The tire 2 has an outer periphery P. The cradles 3,4 each have a radius of curvature in general conformance with the curvature of the outer periphery P. The cradles 3,4 each have an upper curved section $U_1, U_2$ and a lower curved section $L_1, L_2$. The chocks 12,13 depend from the lower curved sections $L_1, L_2$. The wheel lock 1 is suspended by the upper curved sections $U_1, U_2$ so as to let the chocks 12,13 dangle above the ground G. The dual function of the wheel lock 1 can be seen to be first the cradles 3,4 cannot be removed from the tire 2 by jacking up the tire 2 because of the upper and lower curved sections $U_1, U_2$, and $L_1, L_2$. Also letting the air out of the tire 2, merely tightens the engagement between the tire 1 and the cradles 12,13. Thus, the first function of security is met. The second function is providing vehicle safety by effectively blocking the tire in both directions. This clearly adds safety to a trailer parked on a hill or to a car when changing a flat.

In operation, the user grabs the wheel lock 1 by the handles 5, 6 and extends the device to the wide open position shown in FIG. 2. In FIG. 2 the handles and adjustable chocks have been removed. The slider bar 200 has male 20 and female 21 bar halves open to their widest position. The user then mounts the wheel lock 1 onto the tire 2. She next pushes the cradles 3, 4 together and lowers the adjustable chocks 12, 13 to their lowermost position as shown in FIG. 1. One chock might rest on a rock and the other might dangle over a pothole. She locks the cylinder lock 8 with a key. The groove 29 allows the cylinder lock 8 to slide therethrough to the snug position against the tire. The wheel locks are lightweight and are made of a high-strength metal and/or space age high-strength plastics.

Referring next to FIG. 3 the smaller tire 2 is shown in dots, whereas a larger tire 31 is shown by line 31. The cradles 3, 4 have a rear wall 32, 30 respectively which engages the rear of the tire so the wheel lock 1 cannot be pulled forward. For narrow tires where $d_{10} < d_{11}$ spacers 36, 37 are used to narrow the tire opening space $d_{12}$ so the rear walls 30, 32 extend to the tire surface.

Referring next to FIGS. 4, 5 the locking slider bar 200 is shown in detail. The cylinder lock travels in male bar half 20. The male bar half 20 has engagement teeth 51 which catch the locking stud 50 of cylinder lock 8.

Referring next to FIG. 6 the tire 2 is shown in dots, and the larger tire 31 is shown in solid lines. Nominally $\gamma_1 = 13$-inch tire and $\gamma_2 = 15$-inch tire. The adjustable chock 13 is shown in dots in position for smaller tire 2, wherein the axle 61 of upper chock 60 has traveled in space 63 to engage upon upper notch 64. Notch 66 is used in the storage position shown in FIG. 7. The adjustable chock 13 shown in solid lines is set in lowermost notch 65 to fit the larger tire 31. In all cases, the locking surface 15 is put in maximum contact with the ground G.

In operation during an attempted theft where the trailer or car is towed along the ground or if the trailer or car rolls on a hill, two actions occur with the chock 13. First if the chock 13 were dangling over the ground from a higher notch 64, then the axle 61 would slide in groove 63 down to the lower notch 65. If the chock 13 hits the ground G, then the axle 61 will lock into whatever the nearest notch is. Once locked into a notch, the force vector $V_1$, from the tire to the chock 13 creates a force vector $V_2$ from the axle 1 against the notch, thus locking the chock to the cradle.

Referring next to FIG. 7 the adjustable chock 13 is shown in the storage position using notch 66. The adjustable chocks 13, 14 are also removable.

Figure 8:
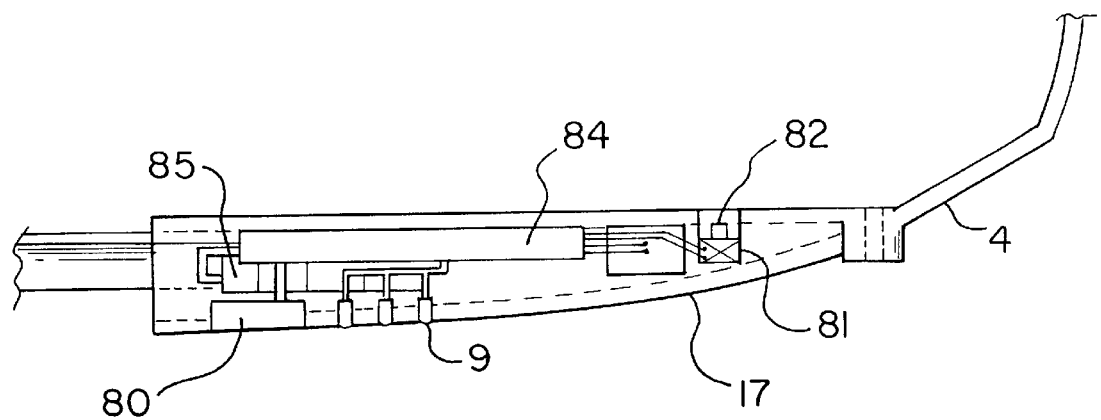
FIG. 8 is top plan partial cutaway view of the electronics package of the same device.
Figure 9:
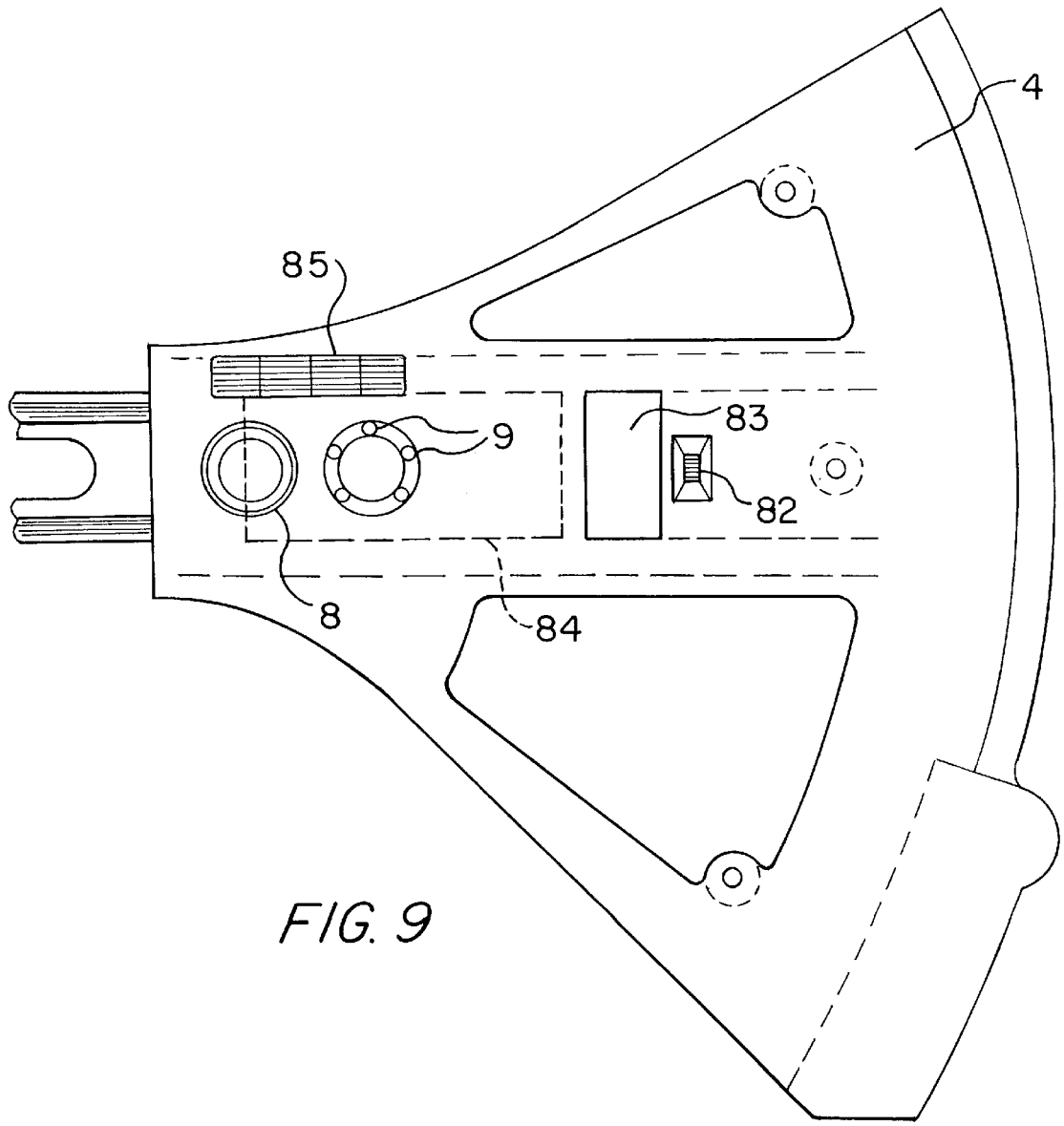
FIG. 9 is a close-up front plan view of the electronics panel of the same device.

Referring next to FIGS. 8, 9 the housing 17 contains an optional alarm system (variable frequency siren and/or flashing strobe light). A motion sensor 81 has a high/low sensitivity switch 82. A battery 83 powers the circuit board 84 which runs the flashing L.E.D. lights 9 and the variable frequency siren and/or flashing strobe light 80 when the motion sensor is activated by a burglary attempt. Vibration and/or motion sensors are known in the art. A solar panel 85 recharges the battery 83.

Figure 10:
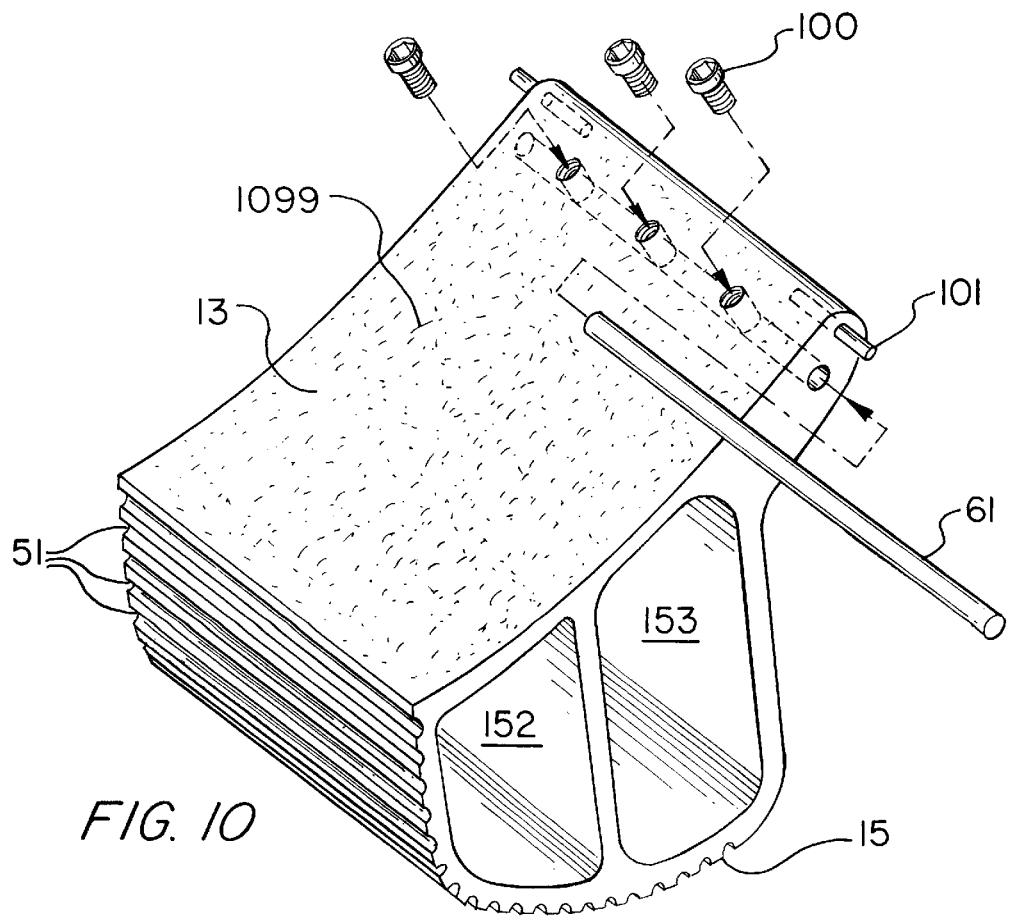
FIG. 10 is a top perspective exploded view of the chock assembly wherein chock has grooves on two sides.

Referring next to FIG. 10 the adjustable chock 13 is lightweight having hollows 152, 153. Construction of aluminum is preferred. Locking surface 15 preferably has grooves 51 to grip the ground. Axle 61 is held in place with screws 100. Pins 101 prevent the adjustable chock 13 from being pulled away from the tire by a thief. A textured brake surface 1099 increases the stopping power against the tire tread.

Figure 11:
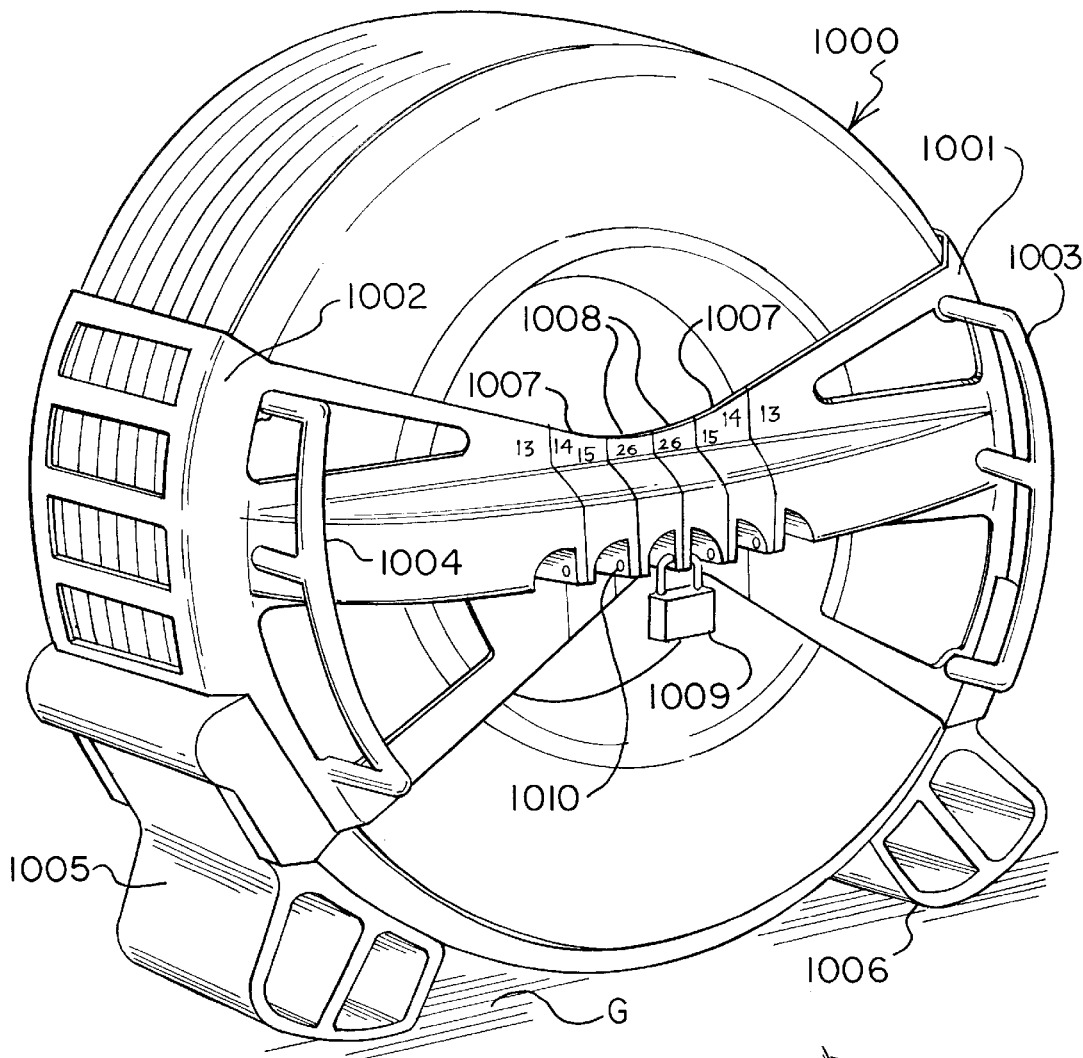
FIG. 11 is a front perspective view of an alternate embodiment having fixed wheel chocks.
Figure 12:
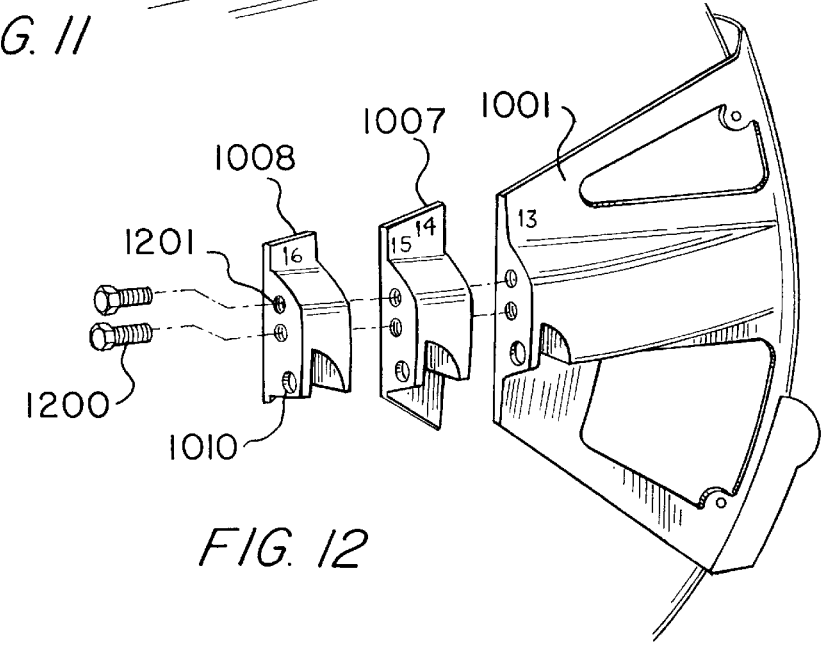
FIG. 12 is an exploded view of the alternate embodiment's size adjustment blocks.

Referring next to FIGS. 11, 12 a larger tire 31 is locked with a wheel lock 1000. Cradle halves 1001, 1002 have respective handles 1003, 1004. The chocks 1005, 1006 do not have to be movable, although they may be adjustable as in the preferred embodiment. The numeric designations 13, 14, 15, 16 show the user the proper tire diameter. The wheel lock must be set up for a known tire diameter by screwing the adjustment blocks 1007, 1008 into the cradle half 1001 using bolts 1200 threaded into holes 1201. The padlock 1009 fits into holes 1010.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A tire lock and block apparatus comprising:

a left and a right cradle each having a rear wall to engage a tire's rear surface and a front panel to engage a tire's front surface, said cradles formed to engage a tire above and below its horizontal centerline at a left and right side of the tire, a lock to lock the left and right cradles together;

a chock mount and chock attached to a lower curved section of each cradle;

said left and right cradle each being curved in general conformance with an outer peripheral curvature of the tire above and below the horizontal centerline to form an upper curved and the lower curved section of each cradle, whereby said upper curved sections suspend said tire lock and block apparatus from an upper half of the tire above a ground surface, thereby precluding the ability to raise the tire and permit the cradles to disengage from the tire;

said chock mount having a dual mode sliding engagement with the chock;

said dual mode sliding engagement comprising a suspension of the chock in a first mode above the ground surface in a neutral chock position, and in a second mode when the tire presses the chock against the ground surface, to create a wedge position for the chock and a locked engagement of the cradle to the chock.

2. The tire lock of claim 1, wherein each cradle further comprises a sliding-bar member, and the lock further comprises a cylinder lock which locks the sliding bar.

3. The tire lock of claim 1, wherein the chock has an upper portion containing an axle which engages a plurality of notches in a housing in the cradle, thereby providing for an adjustment to fit various tires.

4. The tire lock of claim 3 further comprising a motion detector, battery, and alarm housed in one cradle.

5. The tire lock of claim 3, wherein the chock has grooves to engage the ground better.

6. The tire lock of claim 5, wherein the chock has hollows to reduce weight.

7. The tire lock of claim 1, wherein each cradle has a handle.

8. The tire lock of claim 3, wherein the chock is pivotable to a stored position inside the cradle.

9. The tire lock of claim 8, wherein the chock is removable.

10. The tire lock of claim 2, wherein the cradles are V-shaped, have a junction at a lower portion of each V, and have a centerline housing compartment.

11. The tire lock of claim 1, wherein the lock is a padlock fitted through matching holes in the left and right cradle members.

12. The tire lock of claim 11 further comprising adjustment blocks mounted to each cradle member to extend a distance between the cradles, said adjustment blocks each having a hole to receive the padlock.

13. A wheel lock comprising:
   a left and a right V-shaped cradle joined together at a joint at a lower portion of the V shape along a horizontal centerline of a tire;
   said joint comprising a sliding bar having a lock;
   said cradles each having a rear wall segment to engage a rear portion of a tire;
   said cradles each having a housing containing opposing notches in a slider space to removably engage an axle projecting from an adjustable chock, whereby locking the cradles together along the centerline of the tire permits the axle to be positioned in an appropriate pair of notches in the slider space so as to engage the adjustable chock with a ground surface;
   said left and right cradle each being curved in general conformance with an outer peripheral curvature of the tire above and below the horizontal centerline to form an upper curved and a lower curved section of each cradle, whereby said upper curved sections suspend said wheel lock from an upper half of the tire above the ground surface, thereby precluding the ability to raise the tire and permit the cradles to disengage from the tire;
   a chock mount having a dual mode sliding engagement with the adjustable chock; and
   said dual mode sliding engagement comprising a suspension of the adjustable chock in a first mode above the ground surface in a neutral chock position, and in a second mode when the tire presses the adjustable chock against the ground surface, to create a wedge position for the adjustable adjustable chock and a locked engagement of the cradle to the adjustable chock.

14. The wheel lock of claim 13, wherein each cradle has a handle.

15. The wheel lock of claim 14, wherein the adjustable chock is rotatable into a storage position inside a respective cradle.

16. The wheel lock of claim 15, wherein the right cradle further comprises a housing containing alarm electronics.

17. A tire lock comprising:
   a pair of tire chocks each having a top portion containing an axle;
   a left and right tire cradle each suited to lock across a centerline of a tire;
   said tire cradles each having a housing to adjustably receive the axle, thereby preventing rotation of the tire; and
   said left and right tire cradles each being curved in general conformance with an outer peripheral curvature of the tire above and below the horizontal centerline to form an upper curved and a lower curved section of each cradle, whereby said upper curved sections suspend said tire lock from an upper half of the tire above a ground surface, thereby precluding the ability to raise the tire and permit the cradles to disengage from the tire;
   a chock mount for each tire chock having a dual mode sliding engagement with the tire chock; and
   said dual mode sliding engagement comprising a suspension of the tire chock in a first mode above the ground surface in a neutral chock position, and in a second mode when the tire presses the tire chock against the ground surface, to create a wedge position for the tire chock and a locked engagement of each cradle to the tire chock.

18. The tire lock of claim 17, wherein the cradles are joined by a sliding bar having a lock.

19. The tire lock of claim 18, wherein each of said housings further comprise a space for receiving a respective axle, said space having opposing notches to adjust a height of the tire chock above the ground.

20. The tire lock of claim 17 further comprising an electronic alarm housed in a tire cradle.

21. The tire lock of claim 17, wherein said tire chocks each have a tire engaging surface which is grooved.

22. The tire lock of claim 17, wherein the tire cradles each further comprise a rear wall to engage a rear surface of a tire, and said rear wall has a removable spacer to engage a narrow tire.

* * * * *